United States Patent [19]
Knee

[11] Patent Number: 5,386,237
[45] Date of Patent: Jan. 31, 1995

[54] METHOD AND APPARATUS FOR ADAPTIVE PROGRESSIVE SCAN CONVERSION

[75] Inventor: Michael Knee, Strasbourg, France

[73] Assignee: Thomson Consumer Electronics S.A., Courbevoie, France

[21] Appl. No.: 155,113

[22] Filed: Nov. 19, 1993

[30] Foreign Application Priority Data

Nov. 23, 1992 [EP] European Pat. Off. ............ 92403150

[51] Int. Cl.$^6$ .............................................. H04N 7/01
[52] U.S. Cl. ..................................... 348/458; 348/448
[58] Field of Search ................ 348/458, 448, 618–620, 348/625; H04N 7/01

[56] References Cited

U.S. PATENT DOCUMENTS

| | | | |
|---|---|---|---|
| 4,791,487 | 12/1988 | Kozuki et al. | 358/140 |
| 4,868,655 | 9/1989 | Choquet et al. | |
| 4,937,667 | 1/1990 | Choquet et al. | |
| 4,941,045 | 7/1990 | Birch | 348/448 |
| 4,985,764 | 1/1991 | Sato | 348/448 |
| 5,014,903 | 5/1991 | Dougall et al. | 348/448 |
| 5,051,826 | 9/1991 | Ishii et al. | 348/448 |
| 5,166,794 | 11/1992 | Tanaka | 348/448 |
| 5,280,351 | 1/1994 | Wilkinson | 348/448 |
| 5,329,317 | 7/1994 | Naimpally et al. | 348/618 |

FOREIGN PATENT DOCUMENTS

| | | | |
|---|---|---|---|
| 316231 | 5/1989 | European Pat. Off. | H04N 5/44 |
| 2058990 | 5/1990 | Japan | H04N 5/92 |
| 84/00360 | 10/1984 | WIPO | H04N 5/14 |

OTHER PUBLICATIONS

BBC/The Improved Display of 625-Line Television Pictures: Adaptive Interpolation May 5, 1986 Roberts et al.
NHK LABS/HDTV-PAL Standards Converter; Jan. 1986 Tanaka et al.
SMPTE JNL. Oct. 1990, Progressive Scanning: An EDTV Gateway to HDTV.
International Broadcasting, Sep. 1984, San Conversion for Higher Definition Television Tichit et al.

Primary Examiner—Victor R. Kostak
Attorney, Agent, or Firm—Joseph S. Tripoli; Peter M. Emanuel; Richard G. Coalter

[57] ABSTRACT

Extra lines (Yout) for display be progressive scanning are obtained by adaptive interpolation from the original (interlaced) lines. The original lines are left untouched. Each interpolated pixel is the result of a soft switch (456,461,462) between pure interframe interpolation (452), which is the more suitable for areas without moving detail, and interpolation (451) using the Diag-3W algorithm, which is the more suitable for moving areas. The soft switch coefficient (S) is calculated using a normalized comparison between two estimates ($E_v, E_t$) of the likely error resulting from each of the two kinds of interpolation. To limit the occurrence of wrong decisions due to noise or to certain structures in the picture, the decision is spread horizontally, vertically and temporally, but only over a very small area so that the decision remains local to the pixel (X) being interpolated.

18 Claims, 2 Drawing Sheets

METHOD AND APPARATUS FOR ADAPTIVE PROGRESSIVE SCAN CONVERSION

FIELD OF THE INVENTION

The present invention relates to a method and to an apparatus for adaptive progressive scan conversion.

BACKGROUND OF THE INVENTION

There are different algorithms for conversion of video signals from interlaced to progressive (non-interlaced) scanning. But either the picture quality or the noise performance are not good enough with respect to the amount of hardware used.

SUMMARY OF THE INVENTION

It is one object of the invention to disclose a method for improved proscan conversion. This object is reached by the method disclosed in claim 1.

It is a further object of the invention to disclose an apparatus which utilizes the inventive method. This object is reached by the apparatus disclosed in claim 11.

For convenience of discussion, hereafter the term "algorithm" is used to refer to either the "method" of the invention or the "apparatus" of the invention. The motion adaptive algorithm for conversion of luminance signals from interlace to progressive scanning presented here has been tested on 50 Hz signals and delivers a high picture quality and has good noise performance. A simpler algorithm, such as vertical averaging, may be used for the color difference signals.

The 'algorithm' (as noted above, meaning "method" or "apparatus") adaptively interpolates the missing lines in the interlace signal. The original lines are left untouched. Each interpolated pixel is the result of a soft switch between pure interframe interpolation, which is the more suitable for areas without moving detail, and interpolation using the "Diag-3W" algorithm, which is the more suitable for moving areas. The "Diag-3W" algorithm is already disclosed in EP-A-92400762, but is described below for completeness.

The soft switch coefficient is calculated using a normalized comparison between two estimates of the likely error resulting from each of the two kinds of interpolation. To limit the occurrence of wrong decisions due to noise or to certain structures in the picture, the decision is spread horizontally, vertically and temporally, but only over a very small area so that the decision remains local to the pixel being interpolated. Throughout this application mention is made of a 'reference algorithm' which is described in detail. Possible variations to this algorithm are also mentioned at each stage of the description and it is intended that the present patent application should cover all these variations.

In principle the inventive method comprises adaptive progressive scan conversion for interlaced lines, wherein for calculating the samples of the missing lines for each sample (X) a spatial error estimate ($E_v$) is calculated from spatially and temporally adjacent pixels (A–C, F–H) of adjacent fields and a temporal error estimate ($E_t$) is calculated from spatially and temporally adjacent pixels (A, F; B, G; C, H) of adjacent fields. The spatial error estimate ($E_v$) and the temporal error estimate ($E_t$) are combined to form a normalized error estimate ($E_n$). The normalized error estimate controls a soft switch (456, 461, 462) which mixes accordingly a spatially interpolated estimate value ($F_v$) and a temporally interpolated estimate value ($F_t$) for said sample (X) to generate the final value for the sample. The spatially interpolated estimate value ($F_v$) is calculated from spatially adjacent pixels (D, E) of the current field and the temporally interpolated estimate value ($F_t$) is calculated from temporally adjacent pixels (B, G) of adjacent fields.

Advantageous additional embodiments of the inventive method are resulting from the respective dependent claims.

In principle the inventive apparatus for adaptive progressive scan conversion of interlaced lines (T) calculates sample values of the missing lines for each sample (X) and comprises a vertical error circuit (311–322, 34–38) in which from spatially and temporally adjacent pixels (A–C, F–H) of adjacent fields a spatial error estimate ($E_v$) is calculated. A temporal error extimate ($E_t$) is calculated by a temporal error circuit (221–223, 23–28) from spatially and temporally adjacent pixels (A, F; B, G; C, H) of adjacent fields. A a soft switch processor (401) combines spatial error estimate ($E_v$) and the temporal error estimate ($E_t$) to form a normalized error estimate ($E_n$). A spatial interpolation circuit (451) calculates a spatially interpolated estimate value ($F_v$) from spatially adjacent pixels (D,E) of the current field. A temporal interpolation circuit (452) calculates a temporally interpolated estimate value ($F_t$) temporally adjacent pixels (B,G) of adjacent fields. A soft switch (456, 461, 462), controlled by the normalized error estimate, mixes accordingly the spatially interpolated estimate value ($F_v$) and the temporally interpolated estimate value ($F_t$) for the sample (X) to generate the final value for the sample for application to a line speedup circuit (463) for generating the progressive scan output signal ($Y_{out}$) from the interlace lines (T) and the sample values (X).

Advantageous additional embodiments of the inventive apparatus are resulting from the respective dependent claims.

BRIEF DESCRIPTION OF THE DRAWING

Preferred embodiments of the invention are described with reference to the accompanying drawings, wherein.

DETAILED DESCRIPTION

Figure 1:
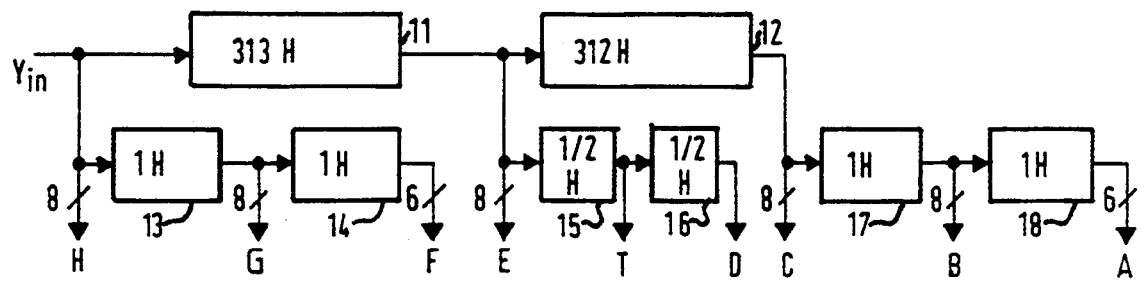
FIG. 1 is a block diagram of a delay circuit for used with temporal and vertical error circuits in an embodiment of the invention.

In the following description the lines involved are denoted by letters according to the letters A to H and T in FIG. 1. In FIG. 1, the incoming luminance signal $Y_{in}$ passes through a 313-line delay 11 and a 312-line delay 12 and through a first 1-line delay 13 and a second 1-line delay 14. The output signal of delay 11 passes through a first ½-line delay 15 and a second ½-line delay 16. The output signal of delay 12 passes through a third 1-line delay 17 and a fourth 1-line delay 18. At the output of delays 18, 17, 12, 16, 15, 11, 14, 13 and at the input of delay 13 the lines or signals with the respective indices A, B, C, D, T, E, F, G and H are available. The following table marks the corresponding positions within the vertical-temporal plane:

TABLE 1

| A |   | F |         |           |
|---|---|---|---------|-----------|
|   | D |   | vertical ↑ |        |
| B | X | G |         | →temporal |
|   | E |   |         |           |
| C |   | H |         |           |

Individual pixels are usually denoted using a suffix giving the horizontal position, the current position being 'n'. The position X of the current pixel corresponds to output T of FIG. 1.

Interpolation Filters:

The two interpolation filters, between which the soft switching mentioned above is made according to the decision criterion described below, are as follows:

In the reference algorithm, the spatial interpolation $F_v$ is the result of the Diag-3W algorithm:

$$S_i = \sum_{j=-1}^{+1} |D_{n+i+j} - E_{n-i+j}|, \quad i = -1, 0, 1,$$

$$F_i = (D_{n+i} + E_{n-i})/2, \quad i = -1, 0, 1,$$

k = value of i for which $S_i$ is a minimum.

$$F_v = \begin{cases} F_k & \text{if the value of } F_k \text{ is between } D_n \text{ and } E_n \text{ inclusive} \\ F_0 & \text{otherwise, } F_0 = (D_n + E_n)/2 \end{cases}$$

In a simpler version of the algorithm, generally pure vertical interpolation $$F_v = (D_n + E_n)/2$$

or any other spatial interpolation algorithm, could be used in place of Diag-3W. The temporal interpolation is $$F_t = (B_n + G_n)/2.$$

Decision Criterion:

In order to select the relative weights of $F_v$ and $F_t$ in the interpolation, at first estimates of vertical and temporal interpolation errors are made:

$E_v = \min \{|2B_i - A_i - C_i|, |2G_i - F_i - H_i|\}$, i = n−1, n, n+1

$E_t = K^* \max \{|A_i - F_i|, |B_i - G_i|, |C_i - H_i|\}$, i = n−1, n, n+1 where K is a weighting factor whose value is '1' in the reference algorithm.

Each of the six components of $E_v$ is a measure of the error that would result from simple vertical averaging, which can be regarded as a safe estimate of the error that would result from Diag-3W.

The nine components of $E_t$ are pure frame differences, which give a measure of the error that would result from pure temporal interpolation. Because that error is more likely to be visible, the maximum is taken.

The use of the minimum of six values for $E_v$ and the maximum of nine values for $E_t$ provides limited horizontal and temporal spreading of the decision and biases it towards spatial interpolation in areas that are likely to be moving.

In another version of the algorithm, the second lowest and second highest values are used, rather than the minimum and maximum, in order to improve noise immunity.

Figure 2:
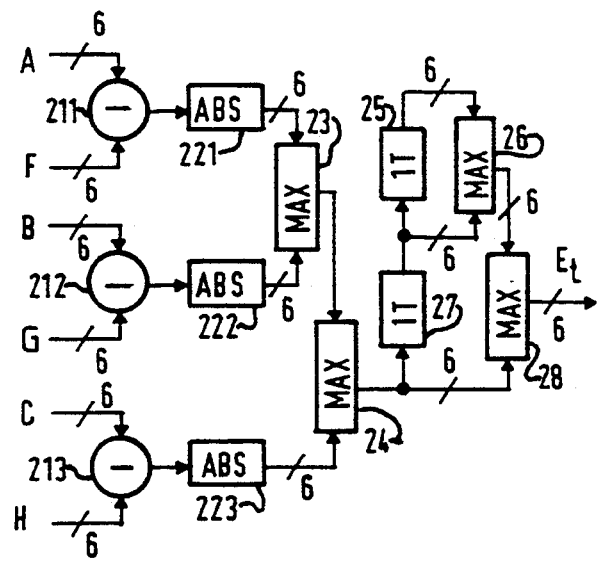
FIG. 2 is a block diagram of a temporal error circuit utilizing signals from the delay circuit of FIG. 1 for generating temporal error signals for use in the interpolation circuit of FIG. 4 embodying the invention.

The temporal error circuit of FIG. 2 receives at its inputs A–C and F–H the current pixels corresponding to the equation for the temporal error. In a first subtractor 211 the value of pixel A is subtracted from the value of pixel F. In a second subtractor 212 the value of pixel B is subtracted from the value of pixel G. In a third subtractor 213 the value of pixel C is subtracted from the value of pixel H. The output signals of subtractors 211 to 213 pass a first 221, a second 222 and a third 223 absolute value circuit, respectively. In a first maximum value circuit 23 the maximum of the output signals of circuits 221 and 222 are calculated. In a second maximum value circuit 24 the maximum of the output signals of circuits 23 and 223 are calculated. The output signal of circuit 24 passes through a first 27 and a second 25 one-clock delay (clock period related to subsequent pixels). From the input and output signal of delay 25 the maximum is calculated in a third maximum value circuit 26, from the output signal of which and the input signal of delay 27 a further maximum is calculated in a fourth maximum value circuit 28, which outputs the temporal error estimate $E_t$.

Figure 3:
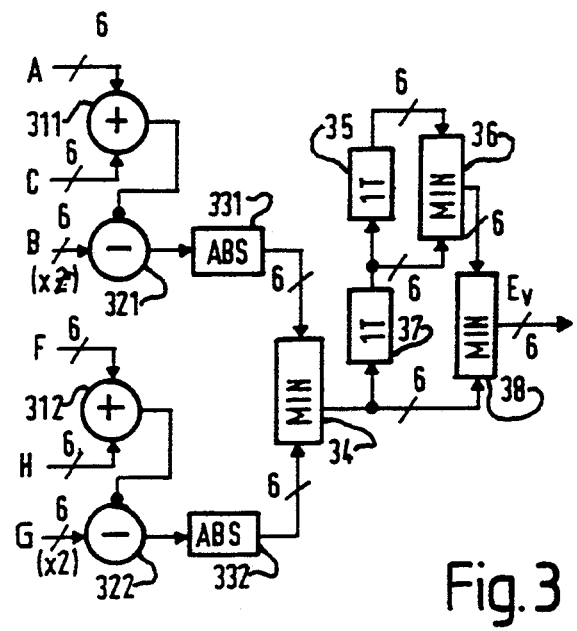
FIG. 3 is a block diagram of a vertical error circuit utilizing signals from the delay circuit of FIG. 1 for generating vertical error signals for use in the interpolation circuit of FIG. 4 embodying the invention.

The vertical error circuit of FIG. 3 receives at its inputs A–C and F–H the current pixels corresponding to the equation for the vertical error. In a first adder 311 the value of pixel A is combined with the value of pixel C. The output signal is subtracted in a first subtractor 321 from the doubled (e.g., by shifting) value of pixel B. In a second adder 312 the value of pixel F is combined with the value of pixel H. The output signal is subtracted in a second subtractor 322 from the doubled (e.g., by shifting) value of pixel G. The output signals of subtractors 321 and 322 pass a first 331 and a second 332 absolute value circuit, respectively. In a first minimum value circuit 34 the minimum of the output signals of circuits 331 and 332 is calculated. The output signal of circuit 34 passes through a first 37 and a second 35 one-clock delay (clock period related to subsequent pixels). From the input and output signal of delay 35 the minimum is calculated in a second minimum value circuit 36, from the output signal of which and the input signal of delay 37 a further minimum is calculated in a third minimum value circuit 38, which outputs the vertical error estimate $E_v$.

In this particular implementation, the calculation of the vertical and temporal errors $E_v$ and $E_t$ uses only the 6 most significant bits of the sample values, which means that the line memories 14 and 18 producing samples A and F need only store to 6-bit accuracy because these samples are not used in the interpolation itself.

In the reference algorithm, the absolute values are not true absolutes but have an error of '1' on negative numbers because they are calculated by selectively inverting the two's-complement representation of the argument according to the sign bit.

Filter Selection:

The two error measures $E_v$ and $E_t$ are used to select between the corresponding two interpolation filters $F_v$ and $F_t$ as follows. First, an intermediate decision criterion $E_n$ is calculated: $\epsilon$ $$E_n = \frac{E_t - E_v}{\max\{E_t + E_v, 1\}} + P$$

where, in the reference algorithm, $P = \frac{1}{4}$. This value was found as reasonable result in case $E_t = E_v$. The term '1' is added to avoid dividing by zero in case max $$\{E_t + E_v\} = 0.$$

$E_n$ is then limited to the range [0,1]:

$$E_n' = \begin{cases} 0 & E_n < 0 \\ E_n & 0 \leq E_n < 1 \\ 1 - \epsilon & 1 \leq E_n \end{cases}$$

where $\epsilon$ represents one least significant bit in the representation of $E_n$.

In the reference algorithm, $E'_n$ is then passed through a linear horizontal filter to obtain the soft switch control value $S_n$:

$$S_n = \sum_{i=-4}^{4} h_i * E'_{n+1}$$

wherein $(h_i, i = -4, \ldots, 4) = (1, 2, 2, 2, 2, 2, 2, 2, 1)/16$ in the reference algorithm but could be any horizontal filter with approximately similar coefficients.

The final result is then $$X = C_v F_v + C_t F_t,$$

where the spatial coefficient $C_v = S_n$ and the temporal coefficient $$C_t = 1 - C_v.$$

Figure 4:
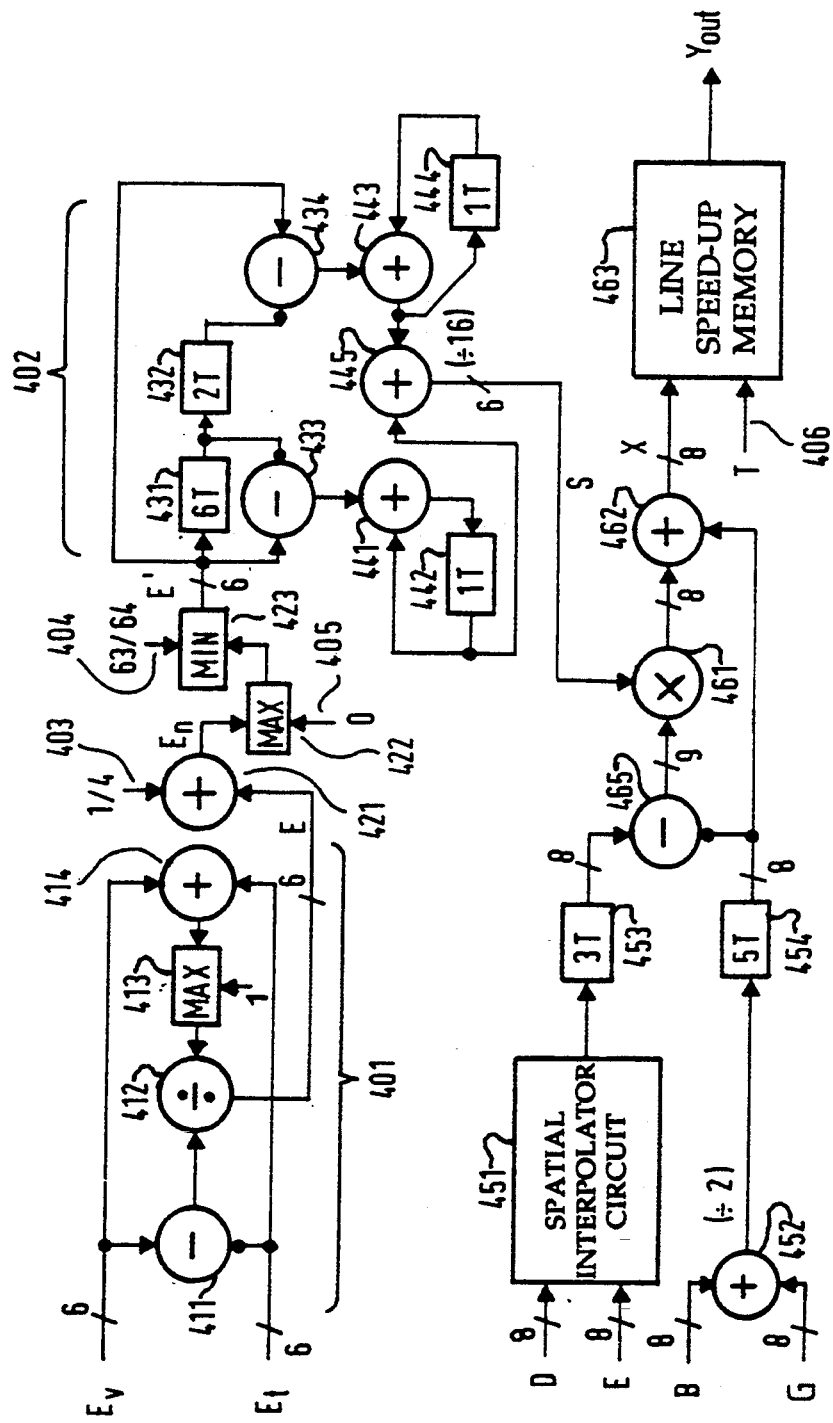
FIG. 4 is a block diagram of an interpolation circuit embodying the invention utilizing the signals provided by the delay circuit of FIG. 1, the temporal error circuit of FIG. 2 and the vertical error circuit of FIG. 3 for providing adaptive progressive scan conversion of an interlaced video signal.

In FIG. 4 the errors $E_v$ and $E_t$ are combined in a soft switch processor 401 to make the normalized error E, which is again expressed to 6-bit accuracy. In processor 401 the errors are combined in an adder 414 and $E_v$ is subtracted in a subtractor 411 from $E_t$. The output signal of adder 414 and the value '1' are fed to a maximum value circuit 413 the output signal of which is used in a divider 412 for dividing the output signal of subtractor 411. Subsequently, in an adder 421 the value $P = \frac{1}{4}$, at input 403 is added, resulting in output signal $E_n$. The output signal of adder 421 passes through a maximum value circuit 422 receiving value '0' at its second input 405 and through a minimum value circuit 423 receiving value '63/64' at its second input 404.

After this limiting to the range [0,1), the result E' is filtered in a horizontal filter 402, in this case using a technique in which the filter is implemented as the average of a 9-tap average and a 7-tap average. The output signal of circuit 423 passes through a six-clock delay 431 and a two-clock delay 432 and is fed to a subtractor 433 in which the output of delay 431 is subtracted from E' and is fed to a subtractor 434 in which the output of delay 432 is subtracted from E'. The output of subtractor 433 is connected to an adder 441 in which its one-clock delayed (delay 442) output signal is added, too. The output of subtractor 434 is connected to an adder 443 in which its output signal is added one-clock delayed (delay 444), too. The output signals of delay 442 and adder 443 are combined in an adder 445 which also divides by '16' (e.g. shift operation). The filtering result S, expressed to 6-bit accuracy in the reference algorithm, is the soft switch control signal for mixing the relative proportions of the spatial interpolation 451 (e.g. Diag-3W) and the temporal interpolation. Samples D and E are input to a circuit 451 for spatial interpolation, the output signal of which is delayed appropriately in a three-clock-delay 453. Samples B and G are averaged in an averager 452, the output signal of which is delayed appropriately in a five-clock-delay 454. The output of delay 454 is subtracted in a subtractor 456 from the output of delay 453 and fed to an adder 462. The output signal of subtractor 456 becomes multiplied in a multipier 461 by value S, the output of which is combined in adder 462 to the output of delay 454, resulting in the interpolated output sample value X. Finally, the interpolated signal X is combined with the suitably delayed input signal T (FIG. 1) in a line speedup memory 463 using standard techniques to make a signal having twice the line scanning rate of the input.

Due to the use of a combination of vertical and temporal error measures to form a balanced decision between the two corresponding modes of interpolation, no motion detector is required which would take only the temporal error into account.

Advantageously, the horizontal low pass filtering of the soft switch control signal E' minimizes the occurrence of wrong decisions while retaining good flicker reduction properties on horizontal edges.

The invention may be used in TV receivers or VCR's or any other display units. The numbers given can easily be adopted to different TV standards or input signal characteristics.

The invention has the following advantages:
near-perfect progressive interpolation of static areas;
gradual rolloff to spatial interpolation in moving areas;
paucity of visible defects;
hardware tractability.

I claim:

1. A method for calculating sample values of interpolated lines for each sample for adaptive proscan conversion of interlaced lines, comprising:
    calculating a spatial error estimate from spatially and temporally adjacent pixels of adjacent fields;
    calculating a temporal error estimate from spatially and temporally adjacent pixels of adjacent fields;
    calculating a normalized error estimate from the spatial error estimate and the temporal error estimate;
    controlling a soft switch in accordance with the normalized error estimate for mixing a spatially interpolated estimate value and a temporally interpolated estimate value for said sample to generate the final value for said sample;
    calculating said spatially interpolated estimate value from spatially adjacent pixels of the current field; and
    calculating said temporally interpolated estimate value from temporally adjacent pixels of adjacent fields.

2. A method according to claim 1, further comprising forming respective pixel differences within each of the adjacent fields for calculating said spatial error estimate.

3. A method according to claim 1 further comprising forming respective pixel pair differences between the adjacent fields for calculating said temporal error estimate.

4. A method according to claim 1 further comprising forming pixel differences corresponding to a detected picture structure direction for calculating said spatially interpolated estimate value.

5. A method according to claim 2 further comprising the step of selecting the lower, especially the minimum, of said pixel differences for calculating said spatial error estimate.

6. A method according to claim 3 further comprising the step of selecting the higher, especially the maximum, of said pixel pair differences for calculating said temporal error estimate.

7. A method according to claim 1 further comprising
forming respective pixel differences within each of the adjacent fields and selecting the second minimum of said pixel differences for calculating said spatial error estimate; and
forming respective pixel pair differences between adjacent fields and selecting the second maximum of said pixel pair differences for calculating said temporal error estimate.

8. A method according to claim 1 wherein the step of calculating said normalized error estimate, En, is calculated according to the formula:

$$E_n = \frac{E_t - E_v}{\max\{E_t + E_v, 1\}} + P$$

where Et is the temporal error estimate, Ev is the spatial error estimate, P is a pre-selected value and $E_n$ is then limited to:

$$E_n' = \begin{cases} 0 & E_n < 0 \\ E_n & 0 \leq E_n < 1 \\ 1 - \epsilon & 1 \leq E_n \end{cases}$$

to form a limited normalized error estimate, E'n, where $\epsilon$ represents one least significant bit in the representation of $E_n$.

9. A method according to claim 8 further comprising filtering said limited normalized error estimate horizontally for controlling said soft switch.

10. A method according to claim 8 wherein said sample is of a given word length and further comprising selecting a word length less than the word length of said sample for calculation of said spatial error estimate (Ev), said temporal error estimate (Et), said normalized error estimate (En) and/or said limited normalized error estimate (E'n).

11. Apparatus for adaptive proscan conversion of interlaced lines by calculating sample values of the missing lines for each sample, comprising:
a vertical error circuit in which from spatially and temporally adjacent pixels of adjacent fields a spatial error estimate is calculated;
a temporal error circuit in which from spatially and temporally adjacent pixels of adjacent fields a temporal error estimate is calculated;
a soft switch processor in which the spatial error estimate and the temporal error estimate are combined to form a normalized error estimate;
a spatial interpolation circuit in which a spatially interpolated estimate value is calculated from spatially adjacent pixels of the current field;
a temporal interpolation circuit in which a temporally interpolated estimate value is calculated from temporally adjacent pixels of adjacent fields;
a soft switch, controlled by the normalized error estimate and which mixes accordingly the spatially interpolated estimate value and the temporally interpolated estimate value for said sample to generate the final value for said sample; and
a line speedup circuit for generating the proscan output signal from said interlace lines and said sample values.

12. Apparatus according to claim 11, characterized in that said normalized error estimate (En) is calculated according to the formula:

$$E_n = \frac{E_t - E_v}{\max\{E_t + E_v, 1\}} + P$$

where En is said normalized error estimate, Et is said temporal error estimate, Ev is said spatial error estimate, P is a pre-selected value and $E_n$ is then limited to:

$$E_n' = \begin{cases} 0 & E_n < 0 \\ E_n & 0 \leq E_n < 1 \\ 1 - \epsilon & 1 \leq E_n \end{cases}$$

to form a limited normalized error estimate (E'n), where $\epsilon$ represents one least significant bit in the representation of $E_n$.

13. Apparatus according to claim 11 wherein said limited normalized error estimate (E'n) is filtered in a horizontal filter, the output signal of which controls said soft switch.

14. Apparatus according to claim 12 wherein said limited normalized error estimate is filtered in a horizontal filter, the output signal of which controls said soft switch.

15. Apparatus according to claim 11 wherein said spatial error estimate, said temporal error estimate, said normalized error estimate and/or said limited normalized error estimate are calculated in the related circuits with a word length less than the word length of said sample.

16. Apparatus according to claim 12 wherein said spatial error estimate, said temporal error estimate, said normalized error estimate and/or said limited normalized error estimate are calculated in the related circuits with a word length less than the word length of said sample.

17. Apparatus according to claim 13 wherein said spatial error estimate, said temporal error estimate, said normalized error estimate and/or said limited normalized error estimate are calculated in the related circuits with a word length less than the word length of said sample.

18. Apparatus according to claim 14 wherein said spatial error estimate, said temporal error estimate, said normalized error estimate and/or said limited normalized error estimate are calculated in the related circuits with a word length less than the word length of said sample.

* * * * *